United States Patent
Holley et al.

(10) Patent No.: US 9,088,453 B2
(45) Date of Patent: Jul. 21, 2015

(54) APPARATUS, SYSTEMS AND METHODS FOR MONITORING THE TRANSMISSION OF MEDIA CONTENT EVENTS

(75) Inventors: Eric Holley, Atlanta, GA (US); Stephen Strong, Dunwoody, GA (US); Frederick Tuck, Dunwoody, GA (US); Jon Richardson, Chamblee, GA (US)

(73) Assignee: EchoStar Technologies L.L.C., Englewood, CO (US)

( * ) Notice: Subject to any disclaimer, the term of this patent is extended or adjusted under 35 U.S.C. 154(b) by 324 days.

(21) Appl. No.: 13/150,434

(22) Filed: Jun. 1, 2011

(65) Prior Publication Data

US 2012/0311171 A1 Dec. 6, 2012

(51) Int. Cl.
| H04L 29/06 | (2006.01) |
| H04N 21/238 | (2011.01) |
| H04N 21/24 | (2011.01) |
| H04N 21/442 | (2011.01) |
| H04N 21/6373 | (2011.01) |

(52) U.S. Cl.
CPC .... H04L 29/06523 (2013.01); H04N 21/23805 (2013.01); H04N 21/2401 (2013.01); H04N 21/4424 (2013.01); H04N 21/6373 (2013.01)

(58) Field of Classification Search
CPC .......... H04N 21/23805; H04N 21/2401; H04N 21/6373; H04N 21/4424; H04L 29/06523
USPC ....................................................... 709/231
See application file for complete search history.

(56) References Cited

U.S. PATENT DOCUMENTS

| 6,310,857 | B1 * | 10/2001 | Duffield et al. ............... 370/232 |
| 7,707,614 | B2 * | 4/2010 | Krikorian et al. ............... 725/94 |
| 8,099,755 | B2 | 1/2012 | Bajpai et al. |
| 8,284,082 | B2 | 10/2012 | Rao et al. |
| 2005/0086553 | A1 * | 4/2005 | Spencer ......................... 713/600 |
| 2006/0075446 | A1 * | 4/2006 | Klemets et al. ............... 725/100 |
| 2007/0021056 | A1 * | 1/2007 | Arseneau et al. ............ 455/3.06 |
| 2010/0278271 | A1 * | 11/2010 | MacInnis ................. 375/240.18 |
| 2011/0202674 | A1 * | 8/2011 | Su et al. ........................ 709/231 |
| 2012/0120254 | A1 * | 5/2012 | Tan et al. ....................... 348/184 |

FOREIGN PATENT DOCUMENTS

WO 2013/030852 A2 3/2013

* cited by examiner

*Primary Examiner* — Un C Cho
*Assistant Examiner* — Fangyan Deng
(74) *Attorney, Agent, or Firm* — Lowe Graham Jones PLLC

(57) ABSTRACT

Systems and methods are operable for monitoring the transmission of media content events. An exemplary embodiment receives a media content stream at a media device from a media content transmission device at a first transmission rate, wherein the media content stream comprises at least one media content event selected for presentation on a media presentation device; stores at least a portion of the media content stream in a media device buffer; calculates a buffer metric; transmitting the buffer metric to the media content transmission device; and receives the media content stream from the media content transmission device at a second transmission rate based on the transmitted buffer metric.

20 Claims, 2 Drawing Sheets

APPARATUS, SYSTEMS AND METHODS FOR MONITORING THE TRANSMISSION OF MEDIA CONTENT EVENTS

BACKGROUND

Media devices, such as a set top box, are configured to receive media content events from a broadcasting system. Non-limiting examples of media content events include movies, news programs, sporting events, serial comedies or dramas, and other program events that are communicated to a media device by a service provider over the broadcasting system. Non-limiting examples of broadcasting systems include satellite systems, cable or other wire-based systems, or over the air (OTA) broadcasting systems.

Media devices may also be configured to receive media content events from a media content transmission device such as an on-demand system. An on-demand system, for example, allows for the transmission of media content events to a media device in response to a user request.

In on-demand systems, media content events were traditionally encoded (i.e., moving pictures experts group (MPEG) standard) at a constant bit rate and transmitted from the broadcasting system and/or an on-demand system to one or more media devices over a constant bit rate channel. For example, standard definition television (MPEG-2 compression) is often encoded at 3.5 megabits per second (Mbits/s). Therefore, the transmission medium would need to have a constant throughput of at least 3.5 Mbits/s to transmit the television content.

It has become advantageous to encode media content events using a variable bit rate, because for certain types of media events, such as a television program, the amount of data that needs to be encoded varies over time. Variable bit rate media content streams typically keep video quality constant but vary the bit rate over time, thus the amount of data required between video frames fluctuates over time. For example, an inactive portion of the media content event requires less data than a portion where there is a large amount of action. Thus it would be inefficient to encode such content at a constant bit rate.

However because of this fluctuation, variable bit rate content can cause problems for the transmission and/or streaming of media content events. Such problems includes limited throughput of the transmission channel, system processing bandwidth and/or a limited amount of available bandwidth. Accordingly, there is a need to provide on-demand systems that can reliably deliver variable bit rate media content events to media devices.

SUMMARY

Systems and methods are operable for monitoring the transmission of media content events. An exemplary embodiment receives a media content stream at a media device from a media content transmission device at a first transmission rate, wherein the media content stream comprises at least one media content event selected for presentation on a media presentation device; stores at least a portion of the media content stream in a media device buffer; calculates a buffer metric; transmitting the buffer metric to the media content transmission device; and receives the media content stream from the media content transmission device at a second transmission rate based on the transmitted buffer metric.

BRIEF DESCRIPTION OF THE DRAWINGS

Preferred and alternative embodiments are described in detail below with reference to the following drawings.

DETAILED DESCRIPTION

Figure 1:
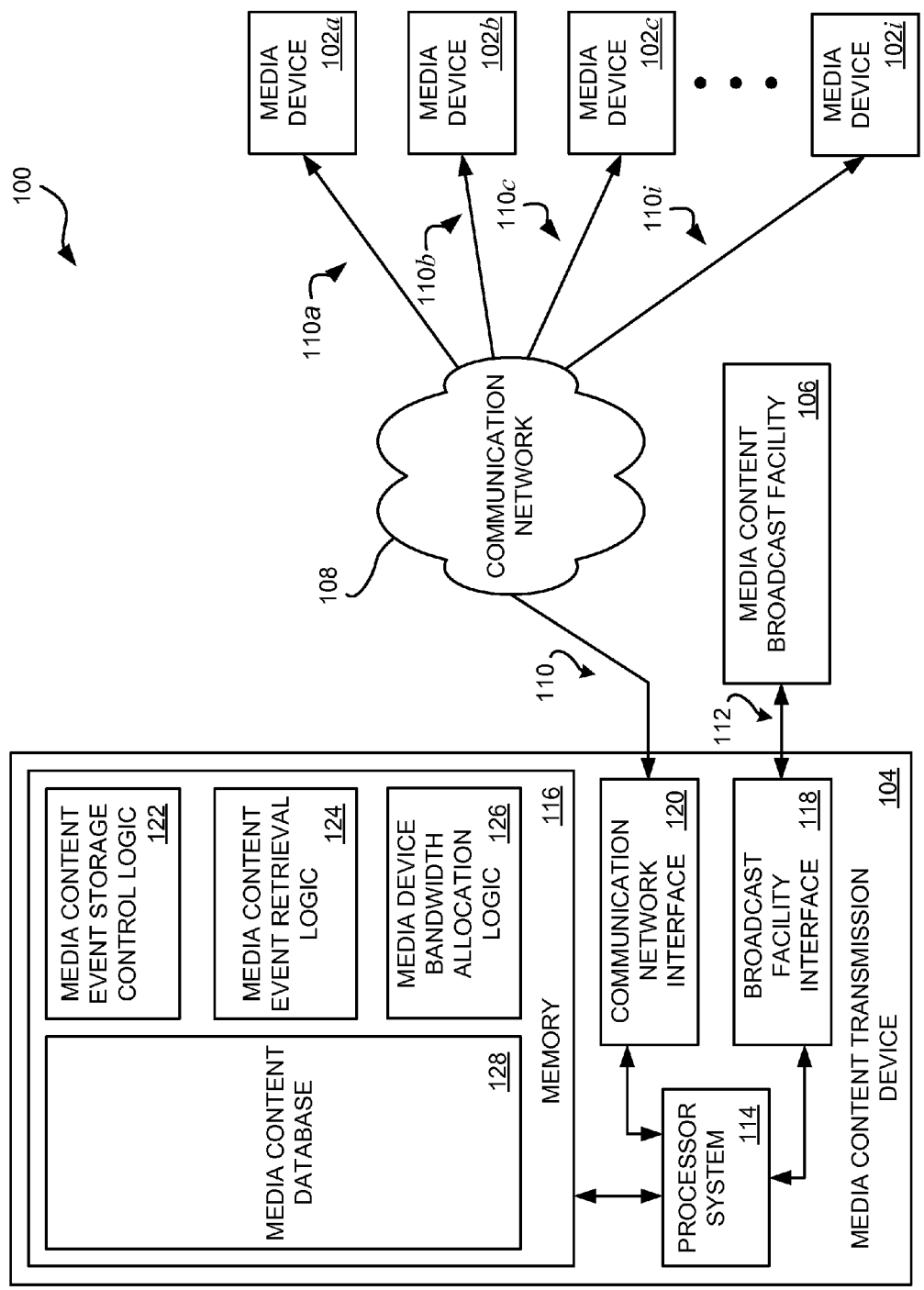
FIG. 1 is a block diagram of an exemplary embodiment of the media content transmission device.

FIG. 1 is a block diagram of an exemplary embodiment of the media content distribution system 100. The exemplary embodiment of the media content distribution system 100 is implemented in an exemplary environment that comprises a plurality of media devices 102, at least one media content transmission device 104, and a media content broadcast facility 106. A communication network 108 connects media device 102 with media content transmission device 104 using communications link 110. A communications link 112 connects the media content transmission device 104 and the media content broadcast facility 106.

The exemplary media content transmission device 104 is configured to store a plurality of media content events, and respond to requests to communicate a media content event to a connected media device 102. The non-limiting exemplary media content transmission device 104 comprises a processor system 114, a memory 116, an optional broadcast facility interface 118, and a communication network interface 120. The memory 116 comprises portions for media content event storage logic 122, media content event retrieval logic 124, media device bandwidth allocation logic 126 and a media content database 128. In some embodiments, the media content event storage logic 122, the media content event retrieval logic 124, and/or the media device bandwidth allocation logic 126 may be integrated together, and/or may be integrated with other logic. In some embodiments, the media content database 128 may be stored in a separate memory medium. Other media content transmission devices 104 may include some, or may omit some, of the above-described components. Further, additional components not described herein may be included in alternative embodiments of the media content transmission device 104.

An exemplary media device 102 includes, but is not limited to, a set top box. Other embodiments of the media device 102 include a television (TV), a digital video disc (DVD) player, a DVD recorder, a game playing device, a mobile device, or a personal computer (PC). The media device 102 is configured to store selected media content events.

An exemplary media content transmission device 104 includes, but is not limited to, an on-demand system. The media content transmission device 104 is configured to store and, upon request, transmit media content events to requesting media devices 102.

In an exemplary embodiment of media content distribution system 100, a media device 102 establishes a communications link 110, via the communications network 108, to the media content transmission device 104. Once the communications link 110 is established between the media device 102 and the media content transmission device 104, the media device 102 requests the media content transmission device 104 to transfer a media content event. In response, the media content transmission device 104 may then transfer at least a portion of the media content event to the media device 102.

In an exemplary embodiment, the media device 102 receives the transmitted media content event from the media content transmission device 104. As the media content event is received, the media device 102 stores the received media content event in a program buffer (not shown).

The program buffer is a memory medium configured to temporarily store data as it is being transmitted from the media content stream to a presentation device (not shown). As described herein, the program buffer is filled as it receives a requested media content event from the media content transmission device 104, and empties as it provides the media content event to a presentation device (not shown), such as a television. The speed at which the buffer fills is nearly equal and/or equal to the transmission rate from the media content transmission device 104 to the media device 102. The speed at which the buffer empties is nearly equal and or equal to a presentation rate of the media content event from the media device 102 to the presentation device (not shown).

A transmission rate herein is the rate at which the data of a media content event is transmitted over a communications medium, and may be measured in terms of the number of bits communicated per second. In contrast, an encoding rate is the rate at which the media content event is sampled in order to create the digital file. In an exemplary embodiment, the encoding bit rate of a multimedia file is the size of a multimedia file in bytes divided by the playback time of the recording (in seconds), multiplied by eight. Media content events with a higher encoding rate have the best quality. In an example embodiment, the media content transmission device 104 may alter the transmission rate while the encoding rate of a media content event remains constant.

In an exemplary embodiment, the media device 102 monitors the filling of and emptying of its own program buffer. The media device 102 further provides a buffer metric to the media content transmission device 104. Upon receipt of the buffer metric, the media content transmission device 104 may adjust the transmission rate and/or prioritize transmission of the communicated media content event.

Buffering at a media device 102 may allow the media device 102 to compensate for various fluctuations in transmission rates from the media content transmission device 104. Buffering may also allow for the media devices 102 to continue presentation of a received media content event during lapses in bandwidth and/or loss of connection to the media transmission device 104.

In an exemplary embodiment, a buffer metric may represent an amount of data stored in the program buffer. For example, but not limited to, the buffer metric may be expressed as the duration of content in the buffer. The buffer metric may also be the amount of data currently in the buffer, the remaining capacity of the buffer, a percentage of capacity available, the percentage of capacity used, and/or the like.

Alternatively or additionally, the buffer metric may also represent a buffer drain rate. The buffer drain rate may be calculated by determining a rate that content is communicated to the presentation device. For example, content may leave the buffer at a rate of x seconds of content per second, where x represents a playback speed on the presentation device. Alternatively, or additionally, such a calculation may then compared to a base buffer drain rate and/or an average buffer drain rate for the content.

In an exemplary embodiment, the media content devices 102 transmit their buffer metric to the media content transmission device 104. The media content transmission device 104 is configured to process each of the received buffer metrics from the plurality of media devices 102. The media content transmission device 104 is further configured to adjust the transmission rate of media content streams carrying media content events to the media devices 102 based on the received buffer metrics.

For example, if media device 102a has a low buffer metric and media device 102b has a high buffer metric, the media content transmission device 104 may increase the transmission rate to media device 102a to more quickly replenish a nearly empty buffer. The media content transmission device 104 may optionally decrease the transmission rate to media device 102b that has a nearly full buffer.

Embodiments of the communication network interface 120 are configured to communicatively couple the media content transmission device 104 with the media devices 102 via the communication link 110. The communication network interface 120 is preferably configured to accommodate a plurality of communication links 110 to a plurality of media devices 102 so that each media device 102 may receive a requested media content event. The communication network interface 120 may be any suitable communication device, component, or system operable to communicate over the communication system 110.

Embodiments of the broadcast facility interface 118 are configured to communicatively couple the media content transmission device 104 with the media content broadcast facility 106, via the communication link 112. The broadcast facility interface 118 may be any suitable communication device, component, or system operable to communicate over the communication link 112 established with the media content broadcast facility 106.

In operation, an exemplary embodiment of the media content transmission device 104 is configured to store a plurality of media content events. The media content event storage logic 122 manages storage of the selected media content events. In an exemplary embodiment, the media content event storage logic 122 may employ a database management system to track and manage a plurality of stored media content events.

Depending upon the configuration of the media content event storage logic 122, one or more of the selected media content events may be stored as they are being broadcast from the media content broadcast facility 106. Alternatively, or additionally, the media content transmission device 104 may have stored the media content events prior to the broadcasting of the media content events.

The identification of selected media content events may be specified in instructions received from the media content broadcast facility 106 and/or the like. For example, instructions may be received to store each first run major network media content event. Alternatively, or additionally, one or more particular channels may be specified for which the selected media content events provided on the specified channels are stored.

Further, the media content event storage logic 122 may manage erasure, deletion, and/or removal of previously stored selected media content events. For example, stored selected media content events may be retained for a predefined duration. Upon expiration of the duration, the initial portion of the selected media content event may be deleted, erased, or otherwise removed.

The media content event retrieval logic 124 manages communication of the requested media content event to requesting media devices 102. The media content event retrieval logic 124 is executed to process each request to establish a communication link 110 with a requesting media device 102. If the request is valid, the communication link 110 is established. For example, an identifier, security code, or the like may be included in the initial request that indicates that the media device 102 is authorized to receive a portion of the requested media content event. Security features may be used to verify that the electronic device that is attempting to establish a communication link is a bona-fide media device 102. Accordingly, access by unauthorized media devices 102, impostor electronic devices, or the like, may be denied.

In an exemplary embodiment, the media content transmission device 104 is configured to transmit the requested media content event to a requesting media device 102a. The media content event is transmitted to the media device 102a in a media content stream at a first transmission rate.

Once the media content transmission device 104 begins transmission of the requested media content event, various embodiments of the media content transmission device 104 may request and/or require the media device 102a to send buffer metric notifications. Alternatively, or additionally, the media device 102a may be configured to automatically send the buffer metric to the media content transmission device 104.

Once the media bandwidth allocation logic 126 receives the buffer metric from the media device 102a. The media bandwidth allocation logic 126 may dynamically manage the transmission rate of the media content stream. In instances where the buffer metric indicates the buffer of the media device 102a will shortly become empty, the media bandwidth allocation logic 126 may provide instructions to the processor system 114 to increase a transmission rate of the media content event to the media device 102a.

In some embodiments, the buffer metric will indicate that a program buffer in a media device is not being emptied (e.g. media content presentation is paused, has been rewound, and/or the like). In such cases, the media content transmission device 104 may stop transmitting the media content event to the media device 102 until a buffer metric is received indicating that the buffer is no longer full.

In alternate embodiments, the transmission rate may be set at a higher rate for an initial portion of the media content stream, thus initially filling a program buffer. For example, but not limited to, the media content transmission device 104 may transmit a media content event at twice its normal transmission rate for the first seconds or minutes of the transmission to enable a user to begin uninterrupted presentation almost immediately. Alternatively, or additionally, the transmission rate may be increased for several minutes to allow for longer periods of uninterrupted presentation during slower transmission rates.

In an exemplary embodiment, the transmission of requested media content event is packetized for communication over the communications system 110. Each packet comprises a header and the packetized content. The header provides identification information pertaining to the contents of the communicated packet. For example, but not limited to, a header may include a device identifier (corresponding to the identity of the media device 102), and a program identifier or PID (corresponding to information that identifies the particular program content). The packet based system allows the media content transmission device 104 to multicast the requested media content event. In other words the media content distribution center may simultaneously transmit the media content event to a plurality of media devices 102. In alternate embodiments the transmission may occur over broadcast systems such as satellite broadcasts and/or the like.

In an alternative embodiment, the media bandwidth allocation logic 126 may estimate the media device 102 buffer metric. To estimate the buffer metric, the media bandwidth allocation logic 126 may sample the media content stream currently transmitting to the media device 102. Based on the sampling, the media bandwidth allocation logic 126 may determine a peak, an average bit rate and/or a median bit rate for the media content stream.

In an exemplary embodiment, the media bandwidth allocation logic 126 also may determine an average transmission rate of the media content stream through the communication network interface 120. Once the average transmission rate has been determined, the media bandwidth allocation logic 126 may determine at any given point in time, if the average transmission rate is greater than a calculated average bit rate of the sampled media content stream, thus determining if the media device 102 is experiencing normal playback. In cases where the transmission rate is less than the average bit rate, the media device 102 will likely have slow or impaired playback.

In an exemplary embodiment, the media content transmission device 104 may be located at any convenient location so as to have access to the communication system 112 and/or the media content broadcast facility 106. Some embodiments may be co-located at, located within, and/or may be an integrated component of, the media content broadcast facility 106.

In some embodiments, a plurality of media content transmission devices 104 may be employed. For example, the plurality of media content transmission device 104 may be geographically dispersed so as to be in proximity to a plurality of media devices 102.

Figure 2:
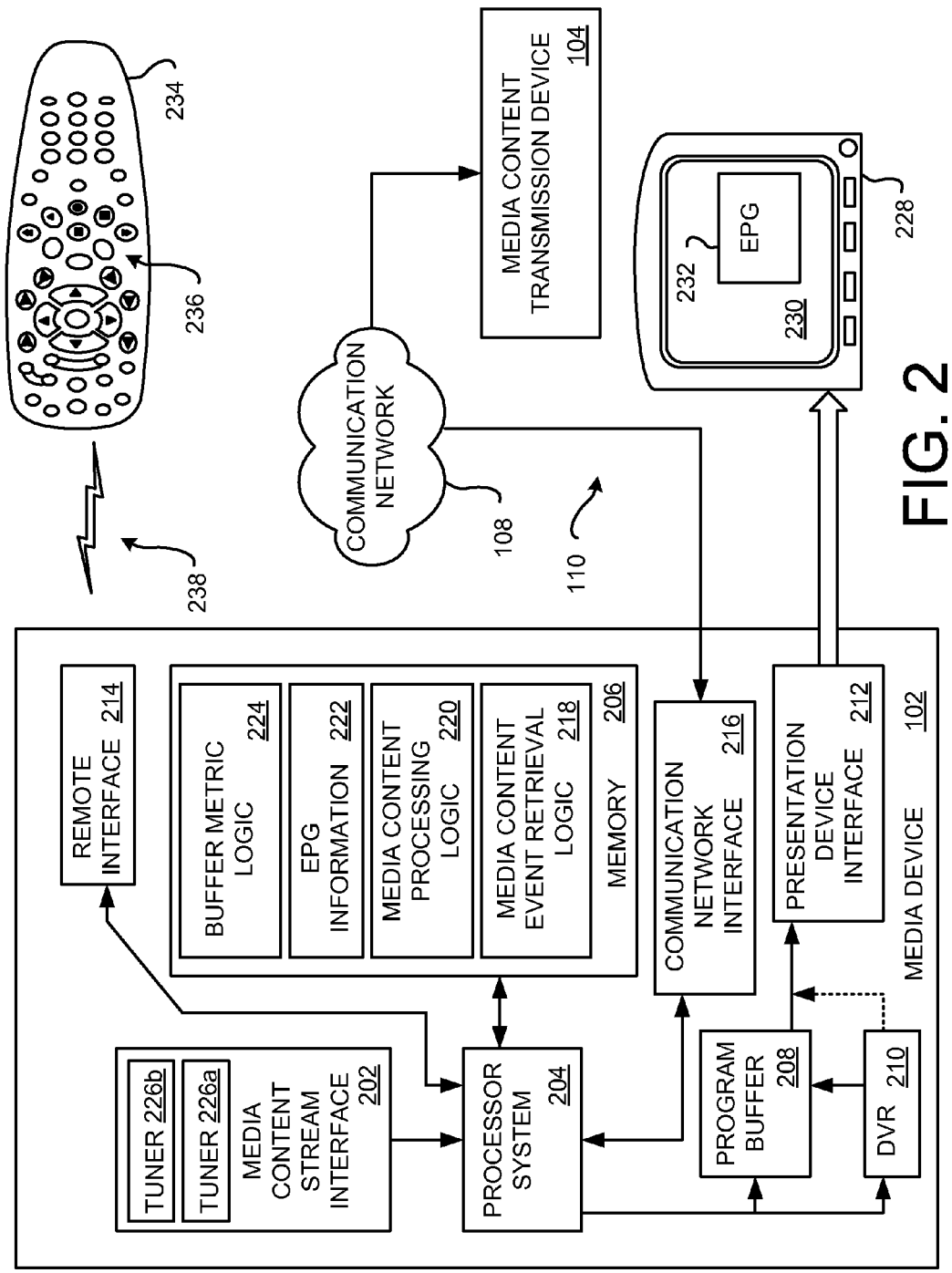
FIG. 2 is a block diagram of an exemplary embodiment of an exemplary media device.

FIG. 2 is a block diagram of an exemplary media device 102 that is configured to request and receive a specified media content event. The non-limiting exemplary media device 102 comprises a media content stream interface 202, a processor system 204, a memory 206, a program buffer 208, an optional digital video recorder (DVR) 210, a presentation device interface 212, a remote interface 214, and a communication network interface 216. The memory 206 comprises portions for storing media content event retrieval logic 218, media content processing logic 220, electronic program guide (EPG) information 222, and buffer metric logic 224. In some embodiments, the media content event retrieval logic 218 and the media content processing logic 220 may be integrated together, and/or may be integrated with other logic. Other media devices 102 may include some, or may omit some, of the above-described media processing components. For example, the media device 102 may comprise and/or be coupled to any suitable recorder that stores media content on a memory medium, such as the exemplary DVR 210. Further, additional components not described herein may be included in alternative embodiments of the media device 102.

The functionality of the media device 102, here a set top box, is now broadly described. One or more broadcast media content streams (not shown) are delivered via a broadcast system 106 (not shown) that is operated by a media content provider. The one or more broadcast media content streams are received by the media content stream interface 202. One or more tuners 226a, 226b in the media content stream interface 202 selectively tune to one of the broadcast media content streams in accordance with instructions received from the processor system 204. The processor system 204, executing the media content processing logic 220, and based upon a request for a selected media content event of interest specified by a user, operates the media content stream interface 202 to receive a selected media content event, and parses out program content associated with a selected media content event of interest. The media content event of interest is then assembled into a stream of video and/or audio information which may be stored by the program buffer 208 such that the media content event can be streamed out to the media presentation device 228 via the presentation device interface 212.

Alternatively, or additionally, the processor system 204 may operate the DVR 210 so that parsed out program content is saved into the DVR 210 for later presentation. The DVR 210 may be directly provided in, locally connected to, or remotely connected to, the media device 102.

In an exemplary embodiment, the program buffer 208 is configured to store any suitable duration of the media content event of interest. An exemplary program buffer 208 may store two hours of media content in its memory medium (not shown). In some embodiments, the program buffer 208 is incorporated into, or is a virtual portion of, the DVR 210.

In this simplified embodiment, the presentation device interface 212 is illustrated as coupled to a media presentation device 228 that includes a display 230, such as a television (hereafter, generically a TV). The video portion of the streamed media content event of interest is displayed on the display 230. The audio portion of the streamed media content event of interest is reproduced as sounds by speakers (not shown).

The exemplary media device 102 is configured to receive commands from a user via a remote control 234. The remote control 234 includes one or more controllers 236. The user, by actuating one or more of the controllers 236, causes the remote control 234 to generate and transmit commands, via a wireless signal 238, to the media device 102. The commands control the media device 102 and/or control the media presentation device 228. The wireless signal 238 may be an infrared (IR) signal and/or a radio frequency (RF) signal. Accordingly, the remote interface 214 is configured to receive the wireless signal 238 emitted by the exemplary remote control 234. An exemplary embodiment permits a user to request a media content event of interest from the media content transmission device 104, such as by navigating about the exemplary EPG 232 that is generated based upon information in the EPG information 222 stored in memory 206.

Embodiments of the communication network interface 216 are configured to communicatively couple the media device 102 with the media content transmission device 104, via the communication network 108. The communication network interface 216 may be any suitable communication device, component, and/or system operable to communicate over the communication network 108.

The communication network 108 is illustrated as a generic communication system. In one embodiment, the communication network 108 comprises the Internet. Accordingly, the communication network interface 216 is a modem or other type of Internet communication device. Alternatively, the communication network 108 may be a telephony system, a radio frequency (RF) wireless system, a microwave communication system, a fiber optics system, an intranet system, a local access network (LAN) system, an Ethernet system, a cable system, a cellular system and/or, or a hybrid system comprised of multiple types of communication media. In such embodiments, the communication network interface 216 is configured to establish the communication link 110 with the communication network 108 on an as-needed basis, and is configured to communicate over the particular type of communication network 108 that it is coupled to.

The media content processing logic 220 manages the various media processing functions. For example, but not limited to, media content processing logic 220 may assemble a received media content event into a video stream and audio stream that is communicated to one or more media presentation devices 228.

The media content event retrieval logic 218 may comprise a data storage repository for information that is used by the media device 102 to retrieve the requested media content event from the media content transmission device 104. For example, a web site address or other identifier of the media content transmission device 104 may be saved in the media content event retrieval logic 218 to facilitate establishment of the communication link 110 between the media device 102 and the media content transmission device 104 and/or communications link 112 between the media device 102 and the media content broadcast facility 106.

The media content event retrieval logic 218 additionally, or alternatively, provides the logic, when executed by the processor system 204, to manage retrieval of the requested media content event. For example, the media content event retrieval logic 218 may process an instruction to retrieve the selected media content event from the remote control 234 or another input device.

In order to determine a buffer metric, the buffer metric logic 224 calculates the amount of data currently stored in the program buffer 208. In an exemplary embodiment, the buffer metric logic 224 also calculates a presentation rate of the media content event of interest. The presentation rate is determined based on the rate that the buffer is emptying and/or draining as a result of the media content event being communicated to the presentation device 228. For example, 8 to 15 Mbit/s is a normal presentation rate for high definition media content events. To determine the presentation rate, the buffer metric logic 224 may sample portions of the media content that is being presented, may take an average of all of the media content that has been presented, may take the highest rate of presentation of the media content event and/or the like.

In another exemplary embodiment, the buffer metric logic 224 additionally determines the transmission rate at which the media device 102 is receiving the media content stream carrying the requested media content event, thereby allowing a comparison between the transmission rate and the presentation rate. In cases where the presentation rate is greater than the transmission rate, then program buffer 208 will be shortly drained thus halting the presentation of the media content event.

The buffer metric may be a numerical value that can be compared to other numerical buffer metrics from other media devices 102. The buffer metric may also take the form of a low, medium and/or high flag. In such cases, the low buffer flag would indicate that the program buffer 208 will shortly be empty. In some cases the buffer metric may simply be a bit flag that indicates a zero if the buffer will empty at the current transmission rate and/or indicates a one if the program buffer 208 is filing at a rate greater than the presentation rate. For example, in cases where the program buffer 208 is filling at a rate greater than the presentation rate, then the media content transmission device may slow the transmission rate.

In an alternate embodiment, the media device 102 may send a notification to the media content transmission device 104 if its program buffer 208 capacity falls below a threshold and/or exceeds a threshold. For example, if the program buffer 208 has less than thirty seconds left in its program buffer 208, a notification may be sent to the media content transmission device 104 alerting it to the low program buffer 208. Upon receipt of such a notification, the media content transmission device 104, may increase and/or decrease the transmission rate of the requested media content event to the media device 102. Alternatively, the media device 102 may slow or stop presentation of the requested media content event.

It should be emphasized that the above-described embodiments of the media content distribution system 100 are merely possible examples of implementations of the invention. Many variations and modifications may be made to the above-described embodiments. All such modifications and variations are intended to be included herein within the scope of this disclosure and protected by the following claims.

The invention claimed is:

1. A method for transmitting media content events to media devices based on buffer metrics from the media devices, the method comprising:
   receiving a media content stream at a media device from a media content transmission device at a first transmission rate, wherein the media content stream comprises at least one media content event selected for presentation on a media presentation device;
   storing received portions of the media content stream in a media device buffer as the portions are received at the media device;
   calculating a buffer metric at the media device during presentation of the received media content stream, wherein the buffer metric corresponds to one of a filling of the media device buffer with the received portions of the media content stream and an emptying of the media device buffer of the stored portions of the media content stream as the media content stream is being presented on the media presentation device;
   transmitting the buffer metric from the media device to the media content transmission device; and
   receiving the media content stream from the media content transmission device at a second transmission rate, wherein the second transmission rate is different from the first transmission rate, and wherein the second transmission rate is based on the transmitted buffer metric,
   wherein calculating the buffer metric that corresponds to emptying of the media device buffer as the media content stream is being presented on the media presentation device further comprises:
   determining a transmission rate that the media device is receiving the media content stream;
   determining a presentation rate that the media device buffer is being drained as the media content stream is being presented on the media presentation device; and
   comparing the determined transmission rate with the determined presentation rate to calculate the buffer metric.

2. The method of claim 1, further comprising calculating the buffer metric based on at least a portion of the media content stream being stored in the media device buffer prior to communication to the media presentation device.

3. The method of claim 1, further comprising calculating the buffer metric based on at least a portion of the media content stream being stored in the media device buffer during communication to the media presentation device.

4. The method of claim 1, wherein an encoding rate of the media content event remains the same for the first transmission rate and the second transmission rate.

5. The method of claim 1, further comprising calculating a duration of the received media content stream stored in the media device buffer, wherein the duration is the buffer metric, and wherein the second transmission rate is based on the duration of the transmitted buffer metric.

6. The method of claim 1, further comprising:
   calculating an average bit rate of media Content event encoding, wherein the media content stream is encoded using a variable bit rate;
   calculating a transmission rate of the received media content stream corresponding to the first transmission rate; and
   calculating a program buffer duration of the media content stream stored in the media device buffer based on the calculated average bit rate of the media content event encoding, wherein the program buffer duration is the buffer metric, and wherein the second transmission rate is based on the transmitted program buffer duration.

7. The method of claim 1, further comprising:
   determining a buffer drain rate; and
   transmitting the buffer drain rate to the media content transmission device. wherein the buffer drain rate is the buffer metric, and wherein the second transmission rate is based on the transmitted buffer drain rate.

8. A method of communicating transmission of media content events from media content event transmission devices to media devices, the method comprising:
   transmitting, at a first transmission rate, a media content stream comprising at least one media content event to a media device;
   receiving a buffer metric from the Media device, wherein the buffer metric is calculated at the media device during presentation of the received media content event, wherein the buffer metric corresponds to one of a filling of a media device buffer with received portions of the media content stream and an emptying of the media device buffer of the stored portions of the media content stream as the media content stream is being presented on a presentation device; and
   adjusting the first transmission rate to a second transmission rate based on the received buffer metric,
   wherein calculating the buffer metric that corresponds to emptying of the media device buffer as the media content stream is being presented on the media presentation device further comprises:
   determining a transmission rate that the media device is receiving the media content stream;
   determining a presentation rate that the media device buffer is being drained as the media content stream is being presented on the media presentation device; and
   comparing the determined transmission rate with the determined presentation rate to calculate the buffer metric.

9. The method of claim 8, wherein the buffer metric is a calculated duration of the media content stream stored in the media device buffer of the media device, and buffered time of presentation time when the media content event is presented on the presentation device.

10. The method of claim 8, wherein when the buffer metric indicates the media device buffer is nearly full, the first transmission rate is greater than the second transmission rate.

11. The method of claim 8, wherein when the buffer metric indicates the media device buffer is nearly empty, the first transmission rate is less than the second transmission rate.

12. The method of claim 8 further comprising:
   requesting a buffer drain rate from the media device; and
   adjusting the transmission rate of the media content event currently transmitting to the media device to be substantially similar to the received buffer drain rate.

13. A media device comprising:
   a communication network interface configured to communicatively couple the media device with at least one media content transmission device and to receive a media content event from the at least one media content transmission device at a first transmission rate;
   a memory medium configured to store at least a portion of the received media content event; and
   a processor system communicatively coupled to the communication network interface and the memory medium, wherein the processor system is configured to:
   calculate a buffer metric during presentation of the received media content event, wherein the buffer metric corresponds to one of a filling of the memory medium with received portions of the media content event and an emptying of the memory medium of the stored portions of the media content event as the media content event is being presented on a presentation device; and operate the communications network interface, such that the calculated buffer metric is transmitted to the at least one media content transmission device, wherein the communication network interface is further configured to receive the media content stream from the at least one media content transmission device at a second transmission rate based on the transmitted buffer metric, wherein calculating the buffer metric that corresponds to emptying of the media device buffer as the media content stream is being presented on the media presentation device further comprises:

determining a transmission rate that the media device is receiving the media content stream;

determining a presentation rate that the media device buffer is being drained as the media content stream is being presented on the media presentation device; and comparing the determined transmission rate with the determined presentation rate to calculate the buffer metric.

14. The media device of claim 13, wherein an encoding rate of the media content event remains constant.

15. The media device of claim 13 wherein the processor system is further configured to:

calculate an average bit rate of the media content stream;

calculate a download rate of the received media content stream; and calculate a duration of the media content stream stored in the memory medium based on the calculated average bit rate and the calculated download rate.

16. The media device of claim 13 wherein the processor system is further configured to:

calculate a drain rate of the memory medium, wherein the drain rate is determined based on the calculated average bit rate of the media content event and a presentation rate of the media content event via the presentation device.

17. The method of claim 1, wherein the buffer metric further corresponds to an indication that the media device buffer is not being emptied.

18. The method of claim 17, wherein the determined buffer metric indicating that the media device buffer is not being emptied further indicates that presentation of the media content event is paused.

19. The method of claim 17, wherein the determined buffer metric indicating that the media device buffer is not being emptied further indicates that the media content event is being rewound.

20. The method of claim 17, wherein transmitting the buffer metric from the media device to the media content transmission device after determining that the media device buffer will become drained when the comparing indicates that the determined presentation rate is greater than the determined transmission rate comprises:

transmitting a low buffer flag from the media device to the media content transmission device, wherein the low buffer flag is a bit with a first value that indicates that the determined presentation rate is greater than the determined transmission rate.

* * * * *